United States Patent
Jönsson (10) Patent No.: US 6,940,736 B2
(45) Date of Patent: Sep. 6, 2005

(54) MULTIPLE SWITCH CIRCUIT WITH LIMITED SWITCH FREQUENCY

(76) Inventor: Ragnar Jönsson, Kyrkobacksvägen 5, SE-271 95 Ystad (SE)

( * ) Notice: Subject to any disclaimer, the term of this patent is extended or adjusted under 35 U.S.C. 154(b) by 0 days.

(21) Appl. No.: 10/482,008

(22) PCT Filed: Jun. 20, 2002

(86) PCT No.: PCT/SE02/01205
§ 371 (c)(1),
(2), (4) Date: Dec. 23, 2003

(87) PCT Pub. No.: WO03/001656
PCT Pub. Date: Jan. 3, 2003

(65) Prior Publication Data
US 2004/0151010 A1 Aug. 5, 2004

(30) Foreign Application Priority Data
Jun. 25, 2001 (SE) .............................................. 0102230

(51) Int. Cl.[7] .......................................... H02M 7/5387
(52) U.S. Cl. ........................................... 363/71; 363/98
(58) Field of Search ................................ 323/272, 283; 363/71, 72, 98

(56) References Cited

U.S. PATENT DOCUMENTS

| | | | |
|---|---|---|---|
| 4,290,101 A | 9/1981 | Hergenhan | 363/65 |
| 4,615,000 A | 9/1986 | Fujii et al. | 363/41 |
| 5,751,150 A * | 5/1998 | Rippel et al. | 324/537 |
| 5,757,634 A | 5/1998 | Ferens | 363/72 |
| 5,973,485 A | 10/1999 | Kates et al. | 323/272 |
| 6,043,634 A | 3/2000 | Nguyen et al. | 323/272 |
| 6,198,261 B1 * | 3/2001 | Schultz et al. | 323/272 |
| 6,232,754 B1 * | 5/2001 | Liebler et al. | 323/272 |
| 6,281,666 B1 * | 8/2001 | Tressler et al. | 323/272 |
| 6,285,571 B1 * | 9/2001 | Brooks et al. | 363/65 |
| 6,346,798 B1 * | 2/2002 | Passoni et al. | 323/272 |
| 6,362,607 B1 | 3/2002 | Wickersham et al. | 323/272 |
| 6,381,155 B1 | 4/2002 | Kadatsky et al. | 363/65 |
| 6,424,128 B1 * | 7/2002 | Hiraki et al. | 323/268 |
| 6,424,129 B1 * | 7/2002 | Lethellier | 323/272 |
| 6,462,521 B1 * | 10/2002 | Yang et al. | 323/272 |
| 6,545,450 B1 * | 4/2003 | Ledenev et al. | 323/272 |
| 6,605,931 B2 * | 8/2003 | Brooks | 323/272 |
| 6,650,096 B2 * | 11/2003 | Lee | 323/272 |
| 6,788,559 B2 * | 9/2004 | Sheng et al. | 363/72 |

* cited by examiner

*Primary Examiner*—Jeffrey Sterrett
(74) *Attorney, Agent, or Firm*—Ladas & Parry LLP (57) ABSTRACT

This invention relates to a multiple stage switch circuit for power electronics. The switch circuit is intended to supply electric power to any type of load. The invention provides a power supply circuit for providing power to a load, comprising: power supply stages each comprising a pair of switchable members in a bridge circuit and an LC filter connected between the center of the bridge circuit and the load, and a control stage for controlling turning on and off of the switchable members. According to the invention at least two power supply stages are connected in parallel with a common output to the load, and said power supply stages are synchronized by a common master control unit. The power supply circuit further comprises a unit for enabling a number of power supply stages while the rest of the power supply stages may be disabled in response to required output power characteristics. Preferably, the number of enabled power supply stages is dependent of the output power (voltage and current), so that the switch frequency range of the power supply circuit is kept within limits.

17 Claims, 11 Drawing Sheets

MULTIPLE SWITCH CIRCUIT WITH LIMITED SWITCH FREQUENCY

FIELD OF INVENTION

This invention relates to a special switch circuit for power electronics. The switch circuit is intended to supply electric power to any type of load. A typical application is control of a three-phase electric AC motor by means of a frequency inverter. Such an inverter has normally three phases, each phase with a switch circuit. This description is made for the switch circuit in one such phase. The switch circuit is normally supplied with electric power from a fixed DC voltage source (the DC link), typically the rectified line voltage or a battery. The purpose of the present invention is to improve the usefulness and performance of the special switch circuit, especially to make it suitable for high output power by means of multiple parallel connected stages.

PRIOR ART

The U.S. Pat. No. 4,947,309 "Method and means for controlling a bridge circuit" describes a special type of switch circuit, presently called the "Sinus switch" because it can supply pure sine-shaped voltages to the load. In the present description, the expression "switch circuit" relates to this special type of switch circuit.

The switch circuit is a conventional bridge circuit, consisting of two transistor switches and two free-wheel diodes connected in series between a positive and a negative supply voltage. Such a bridge circuit is normally used for pulse-width modulated control of the load. However, the conventional transistor bridge circuit is combined with an LC filter at the output of the transistor bridge plus a control circuit that generates a special switch sequence for the transistors.

The primary purpose of the LC filter is to isolate the bridge current from the load current in such a way that the bridge current can go to zero during each switch cycle, although the load current is constant or approximately constant during the same cycle. Such a constant load current is typical for inductive loads such as electric motors. Thanks to the LC filter and the special switch sequence it is possible to turn on the upper or lower transistor at zero transistor current and essentially zero transistor voltage. This eliminates the high electric stress and the electric losses that occur during turn on of conventional bridge circuits.

A secondary purpose of the LC filter is to isolate the switching transients in the bridge circuit from the output of the switch circuit. Thanks to this it is possible to control high levels of electric power with low electric noise at the output of the switch circuit.

A third purpose of the LC filter is to protect the transistor bridge circuit from electric transients that may enter the output of the switch circuit via the motor cables.

A fourth purpose of the LC filter is to deliver well-filtered voltage waveforms to the motor, similar to the normal sine-shaped voltages from the AC line.

The switch circuit according to prior art operates with a variable switch frequency, typically 200 kHz at low load and 20 kHz at full load. Unfortunately, switch transistors for high power are not suitable for operation at such high frequencies. The present invention shows how the frequency range can be reduced by means of several switch circuits that operate in parallel, in dependence of the actual operating conditions.

It is difficult to get a symmetrical load sharing when conventional transistor bridges are connected in parallel. Some components may take a larger share of the load current and this may lead to overheating of these components and in the worst case to thermal runaway. Fortunately, the switch circuit is very well suited for parallel connection. This is based on two facts:

The output from the switch circuit (the inductor current) is a well-defined current pulse. Consequently, the switch circuit acts as a controlled current source. Thanks to this it is possible to connect several such current sources in parallel. They will share the load equally.

Every new switch cycle starts at a well defined zero current and stops by a command from the external world. This makes it possible to synchronize several switch circuits, not only to operate in total synchronism, but also to operate with accurately defined phase shifts, as will be described later.

Several advantages may be achieved by connecting switch circuits in parallel. The operating range of the transistor switch as a whole is extended using the same type of transistor. The frequency range required by the transistors is decreased. The current ripple is reduced. The transistor switch does not require large and expensive capacitors. The high losses in the inductors associated with higher frequencies are avoided.

SUMMARY OF THE INVENTION

The invention provides a power supply circuit for providing power to a load, comprising: power supply stages each comprising a pair of switchable members in a bridge circuit and an LC filter connected between the centre of the bridge circuit and the load, and a control stage for controlling turning on and off of the switchable members.

According to the invention at least two power supply stages are connected in parallel with a common output to the load, and said power supply stages are synchronised by a common master control unit. The power supply circuit further comprises a unit for enabling a number of power supply stages while the rest of the power supply stages may be disabled in response to required output power characteristics.

Preferably, the number of enabled power supply stages is dependent of the output power (voltage and current), so that the switch frequency range of the power supply circuit is kept within predefined limits.

Preferably, the master control unit is arranged to operate with control logic for producing turn-off pulses to all power supply stages as a response to an external signal, and when the current of the inductor of the LC filter of one power supply stage has reached a predetermined value, said one power supply stage operating as a master power supply stage while the rest of the power supply stages operate as slave power supply stages.

The control stage may further comprise individual control units, one for each power supply stage, said individual control units producing their own turn-on pulses automatically to its power supply stage as a response to an internal signal when the current of the inductor of the LC filter of the respective power supply stage is substantially zero.

In a preferred embodiment, the power supply stages are assigned to a number of groups, wherein different groups include different number of power supply stages, said groups being arranged to operate at different output power ranges.

BRIEF DESCRIPTION OF THE DRAWINGS

The invention will be described in detail below with reference to the accompanying drawings, in which.

DETAILED DESCRIPTION OF THE INVENTION

Figure 1:
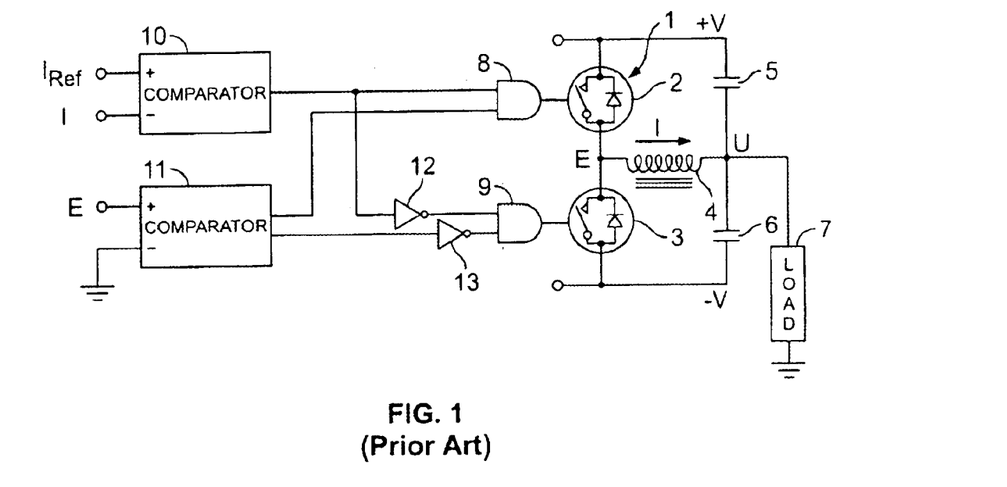
FIG. 1 is a circuit diagram of a switch circuit according to prior art.

FIG. 1 shows a slightly simplified circuit diagram of a switch circuit according to prior art. A transistor bridge 1 consists of two switch transistors 2 and 3, here shown as conventional on-off switches. Free-wheel diodes are shown inside the transistor symbols and they are necessary for the operation of the switch circuit. An inductor 4 is connected between the transistor bridge and the output terminal. Two capacitors 5 and 6 create an LC filter together with the inductor. The load 7 may represent one phase of a three-phase motor.

Two logical AND gates 8 and 9 control the switch transistors. (The drive circuits for the switch transistors are not shown. One or both of the drive circuits are normally galvanically isolated from the signal circuits, as is well known.) The AND gates are controlled by a combination of logic signals from two comparators 10 and 11. Two signal inverters 12 and 13 are used for the lower AND gate.

Figure 2:
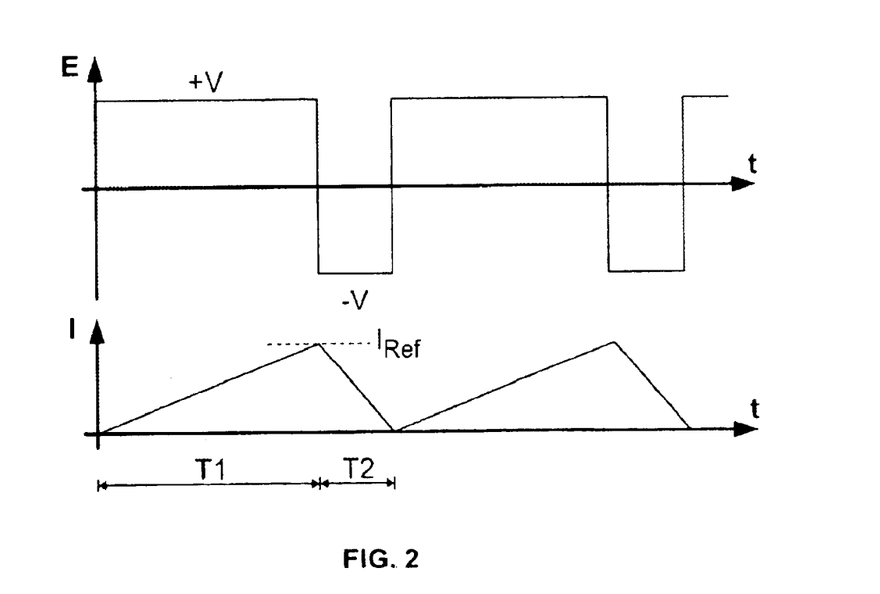
FIG. 2 is a diagram of two typical switch cycles for positive output current obtained in the circuit according to FIG. 1.

FIG. 2 shows two typical switch cycles for positive output current. The waveforms are idealized, but the real waveforms are essentially similar to the ideal waveforms. Thanks to the LC filter, the output voltage U (not shown) is approximately constant during a complete switch cycle. The value of reference current $I_{Ref}$ is assumed to be positive.

The upper transistor 2 is conducting and consequently the voltage E is high. The inductor current I increases with a constant rate. The current comparator 10 reacts when the current I has reached a predetermined level $I_{Ref}$ and generates a negative pulse that turns off the upper transistor. It is possible to measure the current I by means of a measurement winding located at the inductor 4. It is well known that it is impossible to turn off an inductor current abruptly. Consequently, the inductor current I creates a new way through the free-wheel diode in the lower transistor 3 and this forces the voltage E to go negative. This causes the inductor current I to decrease at a constant rate until the current is zero. In this moment an "automatic commutation" takes place, which initiates the start of a new switch cycle. The up and down slopes of the current waveform depend on the actual voltage across the inductor.

The automatic commutation is based on the "reverse recovery current" in the free-wheel diode. The process begins when the inductor current is exactly zero. The lower diode (which has been conducting) is still open and the voltage across the inductor is negative. A reverse recovery current starts to flow in negative direction through the inductor and in backward direction through the lower diode, until the diode has received its "reverse recovery charge". When this happens, the lower diode turns off, but once more the inductor has built up a current that cannot be turned off immediately. This time the inductor current flows in negative direction. The inductor fights back and forces the bridge voltage E to go high until the upper free-wheel diode starts conducting and clamps the voltage E to the positive power supply. This voltage step takes place in a very short time, typically well below 1 microsecond.

The negative current pulse through the diode is not shown in FIG. 2. It is very small and hardly visible in a well designed switch circuit. Diodes with a small reverse recovery charge are best suited for the switch circuit, because they give a small negative current pulse.

The voltage comparator 11 detects the positive voltage step E and generates a logical signal "1" that allows the upper switch transistor to turn on and start a new switch cycle. The main advantage of the switch circuit is that turn-on is generated automatically and in exactly the right moment when the transistor current is zero. Consequently, this is a "soft" turn-on at zero current without electric stress or electric losses in the transistor.

An equivalent, negative switch cycle can be generated when the value of the reference current $I_{Ref}$ is negative. This is made by means of the lower switch transistor 3. The logical AND gate 9 is controlled by the same control signals as the AND gate 8, although the input signals are inverted.

According to prior art the voltage comparator 11 is designed as a "window" comparator with two outputs. There is a small window when the voltage E is halfway between the lower and upper level. Inside this window the outputs from the voltage comparator are such that both switch transistors can be turned on. This helps to start the first switch cycle immediately after power has been turned on.

Because of the triangular current waveform in the inductor the mean value of the output current is always 50% of the peak inductor current $I_{Ref}$.

So far, a switch circuit according to prior art has been described. The present invention is based on prior art, however with modifications both in the power circuits and in the signal circuits.

Figure 3:
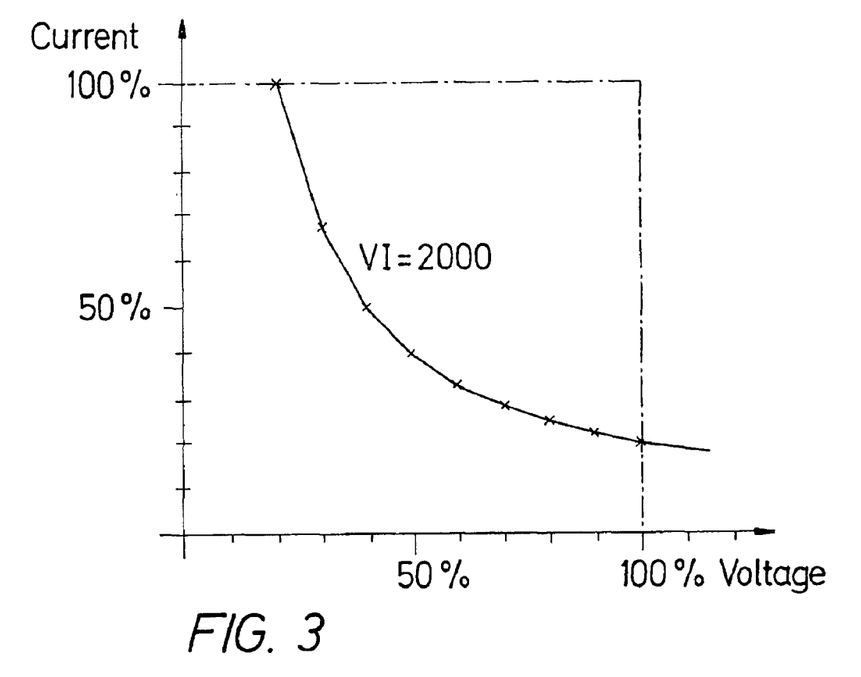
FIG. 3 is a diagram of an ideal operating range.

An electric motor represents a very difficult load for power electronics. Depending on the motor speed and torque, virtually any combination of output voltage and output current are required. FIG. 3 shows an ideal operating range as a square area within 100% limits of voltage and current. The purpose of the present invention is to create an optimal operating area by means of a combination of switch circuits, which operate in parallel.

Just for comparison it should be noted that a resistive load is much easier to control. The operating range of a resistor, if shown in the diagram of FIG. 3, would be a single straight line.

Most frequency inverters operate from a rectified AC line voltage that charges a DC link capacitor to a constant voltage. There are many alternative solutions to this part of the system.

The rectifier may be actively controlled in order to generate a stabilized DC link voltage. The rectifier may be "bi-directional" in order to allow regenerative power flow from the inverter back to the line. The rectifier may have a special design in order to minimize harmonic distortion of the line voltage. All these solutions are not discussed here. It should be noted, however, that two switch circuits can be used in a "back-to-back" configuration, where the first switch circuit controls the load and the second switch circuit operates towards the line. The second switch circuit can be designed to operate as an ideal bi-directional rectifier, with sine shaped waveforms and consequently without distortion of the line voltage.

Obviously it will cost more to build a rectifier for high power than for low power. Also when a switch circuit operates from a battery or from another power supply with limited output power, it is an advantage to restrict the maximum output power. Consequently, a frequency inverter should have a limitation of the maximum output power.

FIG. 3 shows a line (VI=2000) representing constant output power, which starts with very high current at low output voltage and ends with very low current at high output voltage. It will be shown that this characteristic is similar to the output characteristics of the switch circuit. This is also a favorable characteristic. Motor torque is proportional to current and consequently a motor can generate more torque at low speed if it is operated with constant output power. This is often an advantage in real motor drives, for example for starting of a heavy train.

Figure 4:
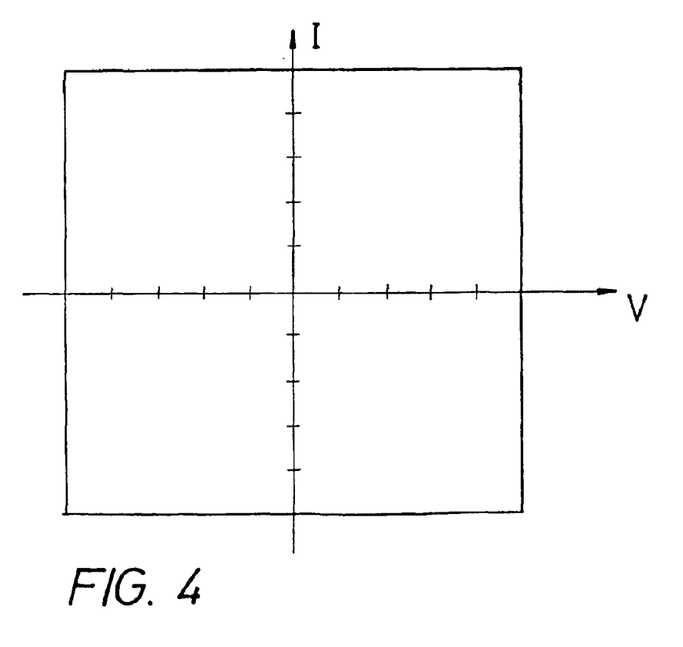
FIG. 4 is a diagram of a four quadrants of current and voltage.

An electric motor must be able to operate in "four quadrants". This means that it can operate in both directions of rotation and be able to generate torque in both directions. Also the switch circuit must be able to operate in four quadrants, as illustrated in FIG. 4. Although only the first quadrant (upper right quadrant) is shown in the following description, the switch circuit is fully symmetrical with respect to the sign of output voltage and output current and the other three quadrants are mirror images of the first quadrant.

The following description is intended to serve as an example for a logical design process. It is not possible to define one "best" solution, because there are many individual parameters and factors to consider. The system designer can make different combinations or choices, all within the scope of the invention.

The power components of a switch circuit represent the major cost of the complete system. Consequently, the design must make an efficient use of all the power components in order to minimize the system cost. There are three types of power components in a switch circuit, the switch transistors with the diodes, the filter inductors and the filter capacitors. As a general rule the switch transistor is the most important part of the system and this dictates the rest of the design.

It is logical to start the design with choice of power transistors. The two main candidates (today) are MOSFETs (Metal Oxide Semiconductor Field Effect Transistors) and IGBTs (Insulated Gate Bipolar Transistors). A MOSFET has a useful frequency range that is typically 10 times higher than that of an IGBT (for example 200 kHz versus 20 kHz). On the other hand an IGBT is smaller and cheaper than an equivalent MOSFET. For high power the only realistic choice is IGBT, and the following description is made for an IGBT solution. The same design principles will of course apply for a MOSFET solution, although with other parameters.

The two main parameters for motor control are the output voltage and current. The maximum output voltage depends mainly on the available DC link voltage. The size of the motor defines the maximum current that shall be supplied by the switch circuit. Consequently, the whole design must be based on the required motor voltage U and motor current I.

FIG. 2 shows that the inductor in the switch circuit delivers a saw-tooth-shaped current waveform to the filter capacitor. It is possible to calculate the switching time for a complete switch cycle if all the other parameters are given.

FIG. 2 shows a positive current pulse.

The voltage across the inductor is (V−U) during time T1 (the upper transistor is ON).

The current rises from zero to $I_{Ref}$.

It is possible to calculate the time T1 if the resistive voltage drop in the inductor is neglected.

$$T1 = \frac{LI_{Ref}}{V - U}$$

The voltage across the inductor is (−V−U) during time T2 (the lower free-wheel diode is conducting). The current decreases from $I_{Ref}$ to zero during time T2. It is possible to calculate the time T2.

$$T2 = \frac{-LI_{Ref}}{-V - U} = \frac{LI_{Ref}}{V + U}$$

$$T1 + T2 = LI_{Ref}\left(\frac{1}{V - U} + \frac{1}{V + U}\right) = \frac{2LI_{Ref}V}{V^2 - U^2}$$

The inverse of (T1+T2) gives the switch frequency f.

$$f = \frac{V^2 - U^2}{2LI_{Ref}} = \frac{V\left(1 - \frac{U^2}{V^2}\right)}{2LI_{Ref}}$$

A switch circuit according to prior art operates in a frequency range typically from 20 kHz to 200 kHz. It is the purpose of the present invention to reduce this frequency range substantially. Rearrangement of the last equation shows how the current $I_{Ref}$ can be calculated if the switch frequency is given.

$$I_{Ref} = \frac{V\left(1 - \frac{U^2}{V^2}\right)}{2Lf}$$

In a real circuit there are different criteria for the choice of maximum switch frequency and minimum switch frequency. A low switch frequency requires large filter components and the cost and size of these components must be considered. This defines the minimum switch frequency. In a practical circuit 10 kHz can be a good choice for minimum switch frequency.

The switch transistors normally define the maximum switch frequency. Thanks to the soft turn-on of the switch transistors in the switch circuit, the transistors can be operated with a higher switch frequency than in a conventional, hard-switching circuit. As an example, a realistic maximum switch frequency for a switch circuit with modern IGBTs can be 20 kHz. This example gives a ratio of 2:1 between the maximum and minimum frequency.

If the switch circuit shall be used for high frequency signals, for example controlling high-speed motors, it may be necessary to use a higher minimum switch frequency than 10 kHz. A rule of thumb says that there shall be at least 20 samples for a full period of an output sine wave.

The limitation of maximum switching frequency makes it easier to design an inductor with low losses. The losses in the core of an inductor increase very fast with the operating frequency. It will be possible to choose a cheaper core material or a material with higher saturation flux when the frequency is lowered.

Figure 5:
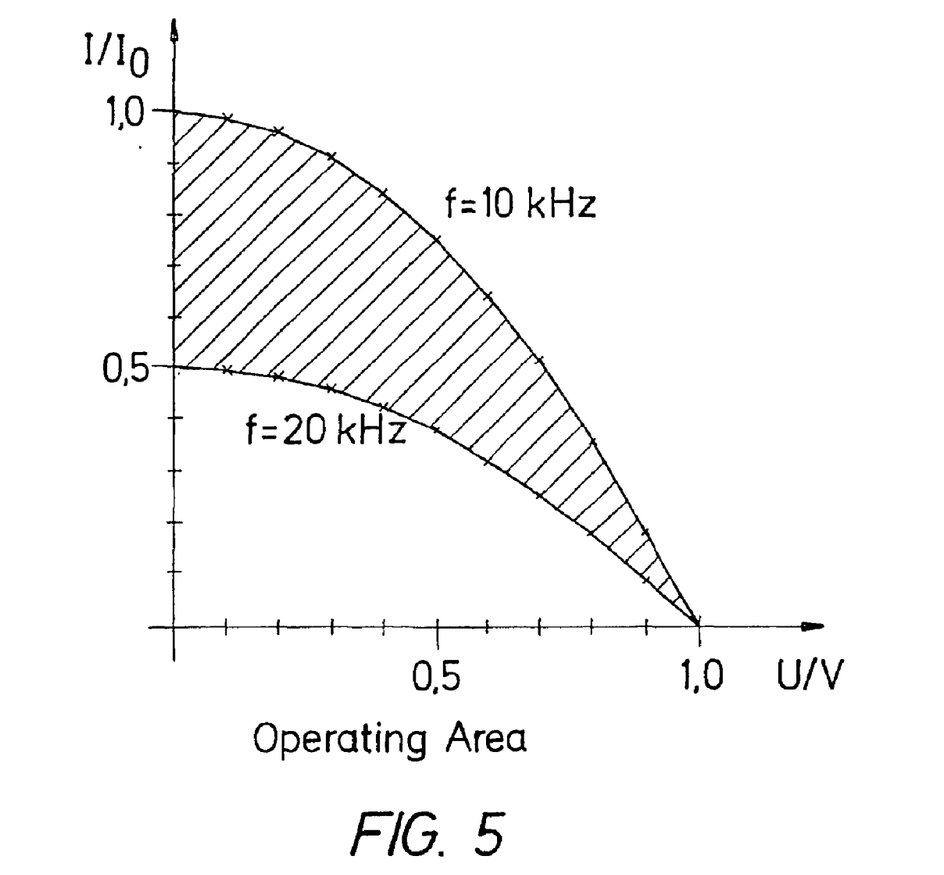
FIG. 5 is a diagram of the operating area for a typical switch circuit.

FIG. 5 shows the operating area for the switch circuit in a diagram with a horizontal axis for the normalized output voltage U and a vertical axis for the normalized output current I. A fixed switch frequency f according to the above equation defines a line in the diagram. If one line for maximum switch frequency and one line for minimum switch frequency are drawn, the area between these two lines represents the useful operating area for the switch circuit. The example shows two lines that represent switch frequencies 10 kHz and 20 kHz. The shaded area is the useful operating area.

Obviously there are serious limitations in such an operating range. It is not possible to get low output current when the output voltage is low, and it is not possible to get high output current when the output voltage is high. It is the purpose of the present invention to increase the useful range of the switch circuit by means of parallel connected circuits.

Figure 6:
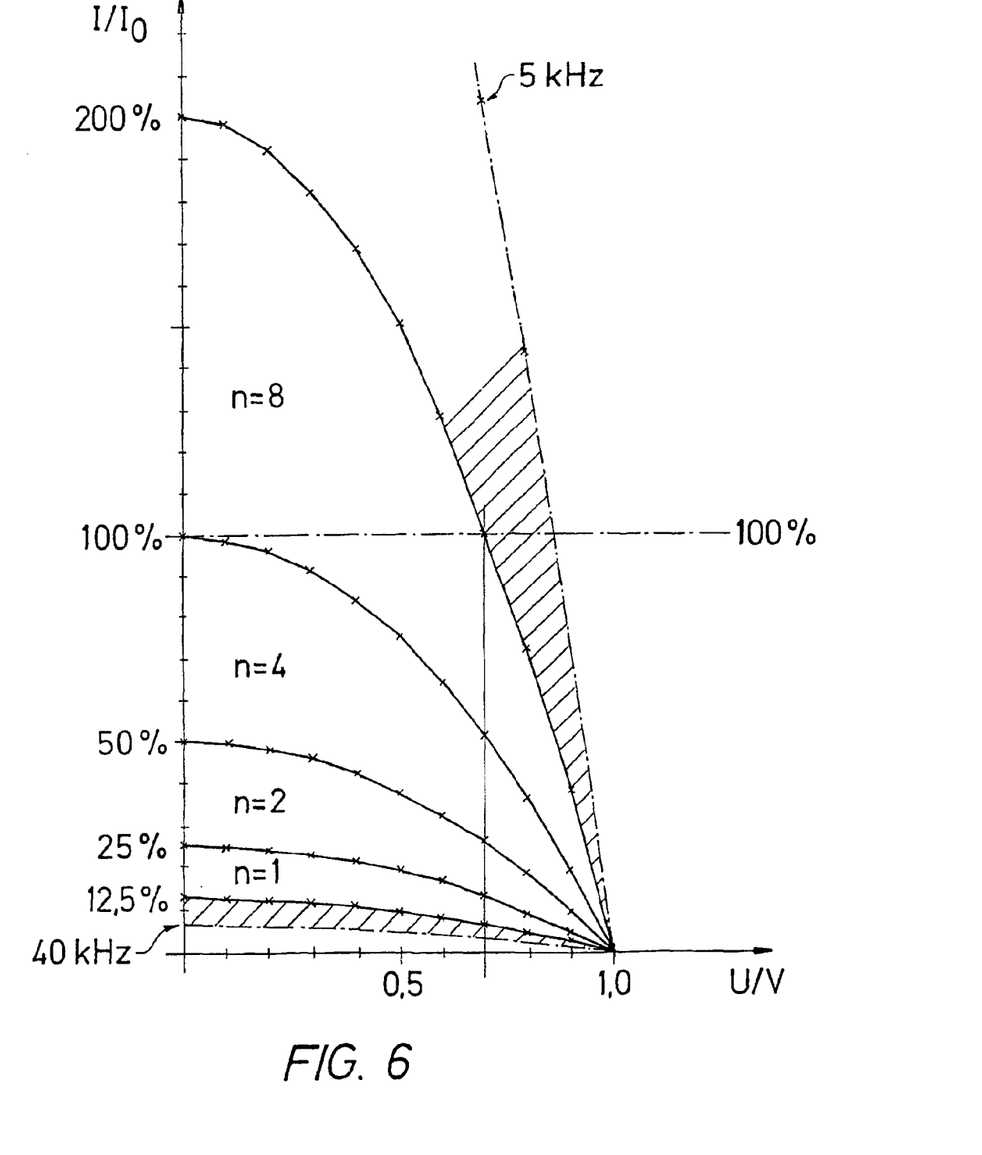
FIG. 6 is a diagram of the total operating range for four groups of switch circuits according to the present invention.

FIG. 6 shows an example of the total operating range for four groups of switch circuits. The individual switch circuits are supposed to be identical and each of them has the same inductor value L. The figure "n" gives the number of parallel-connected circuits in each group. All groups operate within the same frequency range 10–20 kHz. If motor current at rated torque is defined as 100%, the maximum output current at zero output voltage would be 200%. The diagram shows that 100% current can be obtained for output voltages up to 70% of the DC link voltage. Unfortunately, it is not possible to get 100% current up to 100% voltage, but this is compensated by the possibility to get 200% current at low output voltage. This means that the motor can have 200% starting torque and this is often a great advantage. The operating range of the motor can also be extended to higher speeds by means of field weakening, although the output voltage is limited.

The operating ranges of the different groups of switch circuits fit together exactly, without overlapping. The possible current ratio has been extended 8 times by means of the extra circuits. A single switch circuit would have needed a switch frequency ratio of 16:1 instead of 2:1 in order to get the same current range.

FIG. 6 starts with low current from one module (n=1) with inductance L and a current range between 12,5% and 25% of nominal current. The second group of modules (n=2) has a total equivalent inductance L/2 and a maximum current 50%. The third group of modules (n=4) has a total equivalent inductance L/4 and a maximum current 100%. The fourth group of modules (n=8) has a total equivalent inductance L/8 and a maximum current 200%.

The example in FIG. 6 has been made for the frequency limits 10 kHz and 20 kHz. However, in reality there are no absolute frequency limits. It should be possible to use lower frequencies, at least temporarily, and this possibility can be used at high output voltage in order to get a higher output current. FIG. 6 shows a dotted line, which represents the output from 8 units when operated down to 5 kHz. The shaded area represents the extended output range. The extra low frequency should be used only when the output voltage U is high. Otherwise the current will become excessively high, both for the transistors and for the inductors.

When the current I is low, it should be possible to increase the switch frequency without creating too high transistor losses. FIG. 6 shows an extended operating range in the low current area. The shaded area indicates the extended range if the switch frequency is doubled from 20 kHz to 40 kHz.

Switch circuits according to prior art can be connected to operate in parallel, with a common output and with each circuit individually controlled according to FIG. 1. In such a case they will not be synchronized. However, it would be an advantage to synchronize the circuits in order to avoid possible "beat" effects or sub-harmonic frequencies at the output, which can occur if the circuits operate with slightly different frequencies.

The switch circuit according to prior art is self-oscillating, with a variable switch frequency, which depends on the actual operating conditions. Transistor turn-on in this switch cycle is generated automatically by the circuit itself, in exactly the right moment. Consequently, one should never try to control transistor turn-on by external signals. It is, however, possible to control transistor turn-off by external signals, since this is a conventional "hard" turn-off. This possibility is used in the present invention.

Figure 7:
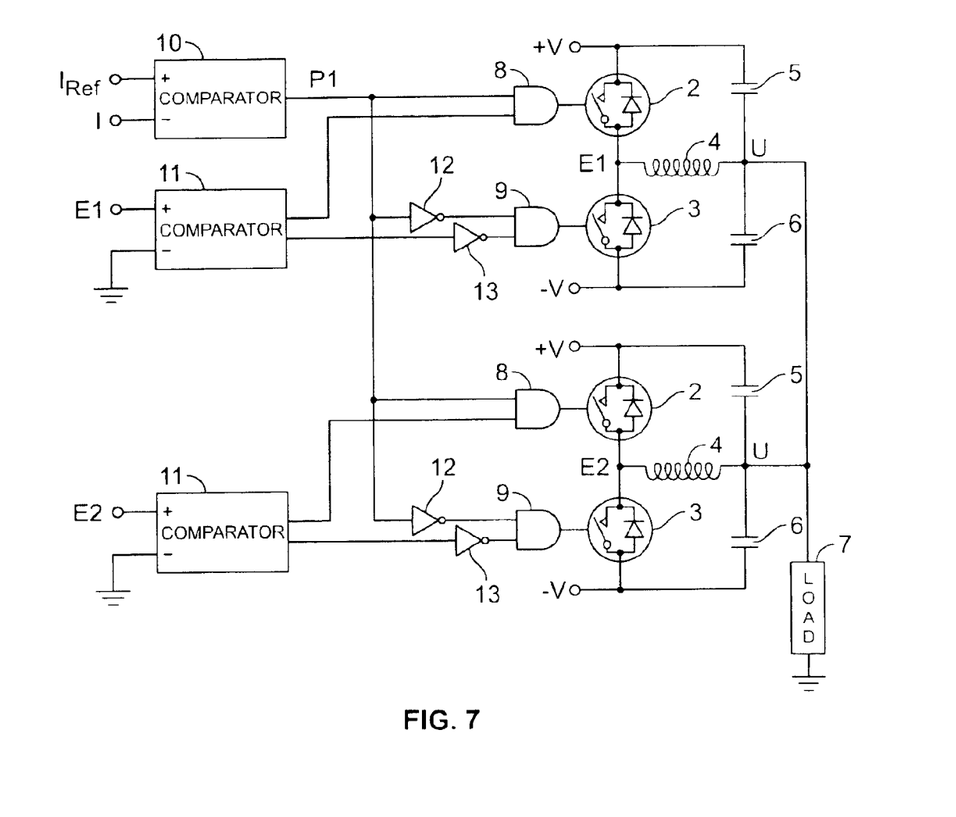
FIG. 7 is a circuit diagram of an arrangement to synchronise two switch circuits according to the present invention.

FIG. 7 shows a preferred arrangement and method to synchronize two switch circuits. The current comparator 10 is controlled by the inductor current in the upper switch circuit. It generates the turn-off signal P1 for the transistors. Both the upper and the lower switch circuits are controlled by this signal. However, each switch circuit has its own voltage comparator 11, and each voltage comparator is controlled by a voltage signal (E1 and E2) from its own circuit. This guarantees that the critical turn-on of the transistor is made in exactly the correct moment, when the inductor current is zero. The inductor currents in the two circuits will be almost identical if the inductors have the same inductance value.

The upper switch circuit in FIG. 7 is called a "master" circuit and the lower switch circuit is called a "slave" circuit.

In practice, all the switch circuits, both the master and the slave, are identical modules, each with its own current comparator 10 and voltage comparator 11. The current comparators 10 of the slave circuits are not used and are not shown in the figures. By changing control signals, a slave circuit can take on the function of a master circuit and vice versa, if necessary or for more equal sharing of the load, as is discussed below.

The triangular inductor currents from the two synchronized switch circuits in FIG. 7 will generate a certain voltage ripple across the filter capacitors 5 and 6. It would be a great advantage to create a phase shift between the two currents, such that the current maximum from the slave circuit comes exactly halfway between two current maximums from the master circuit. Such a phase shift can easily be created, if the stop pulse from current comparator 10 to the slave circuit gets a phase delay of 180 degrees. (One complete switch cycle in the master circuit is defined as 360 degrees.) With such a phase shift the current ripple which reaches the capacitors is reduced at least two times. The exact ripple reduction depends on the actual working conditions. In the most favorable operating point the ripple is reduced completely. In any case the ripple frequency is doubled. Consequently, the voltage ripple across the capacitors is reduced at least four times. In other words, if a certain amount of voltage ripple is specified, it is possible to use smaller and cheaper capacitors thanks to the phase shift.

Figure 8:
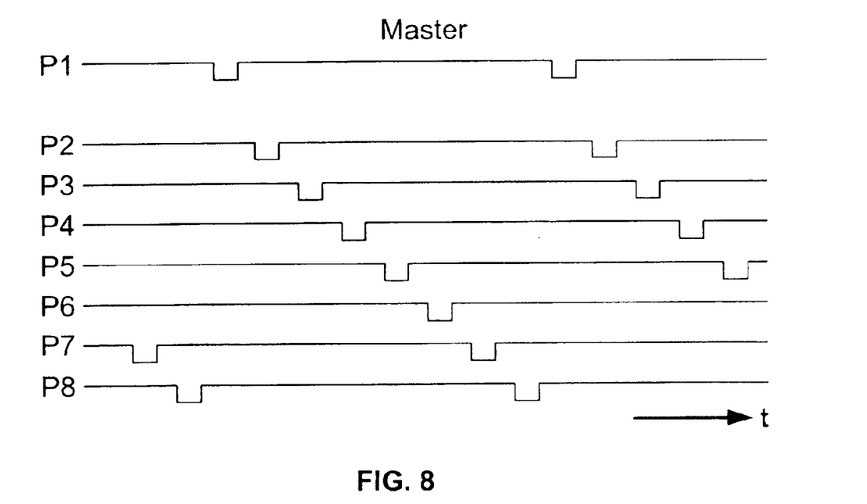
FIG. 8 is a diagram of eight different phase shifted stop pulses.

The reduction of voltage ripple will be even better if many switch circuits are connected in parallel. FIG. 6 shows an example with 8 switch circuits in parallel. FIG. 8 illustrates how 8 different phase shifted stop pulses should be generated in such a group with one master circuit and 7 slave circuits. The upper curve shows the output P1 from current comparator 10 in the master circuit. The pulse P1 is reference for the other pulses. In a system according to FIG. 7, with only one slave circuit, one should use stop pulse P5 (180 degrees phase shift) for the slave circuit. In a system with 3 slave circuits one should use the stop pulses P3, P5 and P7 which are evenly distributed with 90 degrees phase shift.

It is obvious that such a large number of phase shifted inductor currents will create an almost ripple-free current to the output capacitors. This is a major advantage of parallel connection and a major reason to use a great number of parallel connected circuits. The total capacitance value of the filter capacitors can be much smaller than in a single circuit for the same total current. It should be observed that all the filter capacitors are always connected to the output, also when a reduced number of switch circuits are active.

Figure 9:
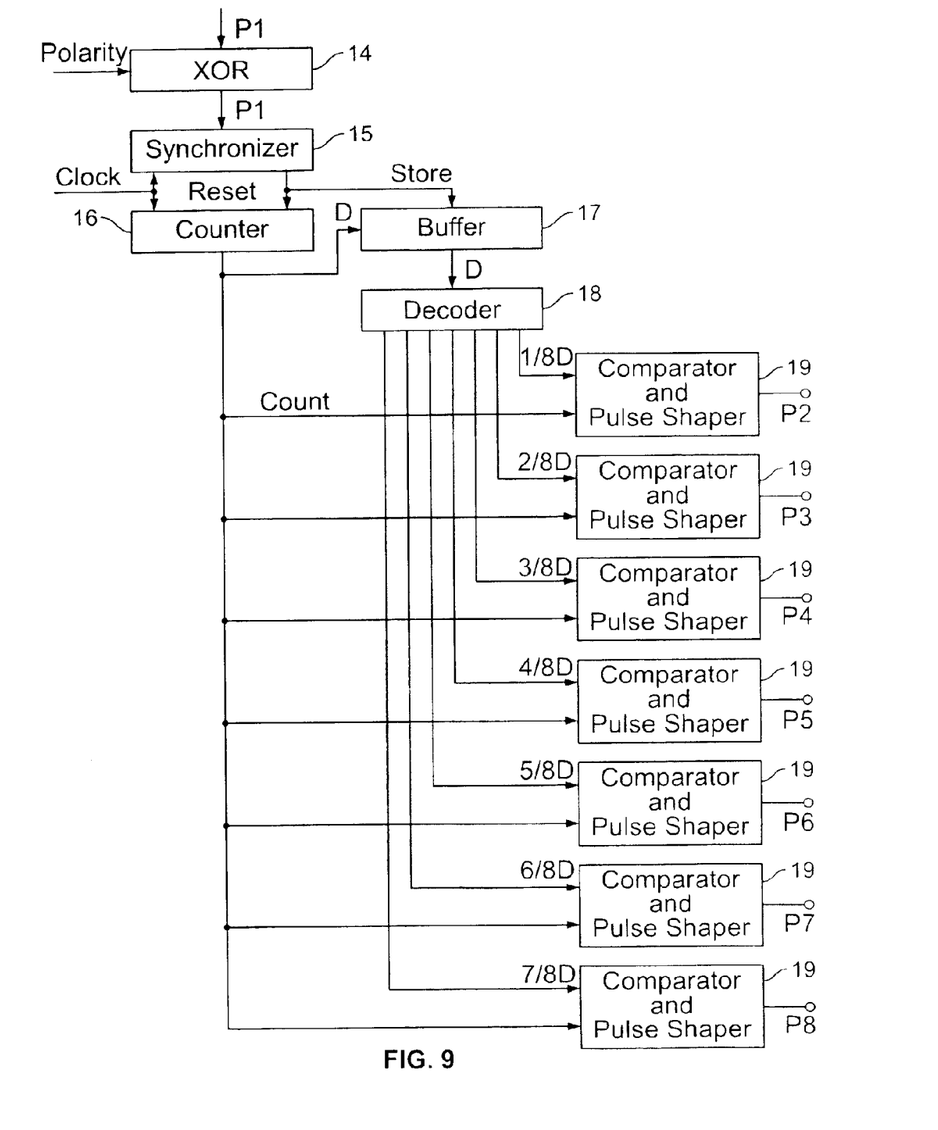
FIG. 9 is a circuit diagram of an arrangement to generate the phase shifted pulses in accordance with the present invention.

FIG. 9 gives an example of how the phase shifted pulses P2–P8 can be generated in relation to the pulse P1 that originates from the master circuit. The turn-off pulse P1 from the current comparator 10 in the master circuit is connected to an XOR gate 14 (Exclusive OR). A separate "polarity signal" has the logical value "1" or "0" depending on the sign of the current reference value $I_{Ref}$. This signal is connected to the second input of XOR gate 14 with the purpose of inverting the signal P1 when the polarity changes. Thanks to this, the output signal from the XOR gate will always be correct for the intended purpose, independent of the current polarity. A clock frequency, which is much higher than the maximum switch frequency, typically 100 times higher or more, is connected to a "synchronizer" 15 and a "counter" 16. The counter 16 operates continuously and counts the clock pulses.

Figure 10:
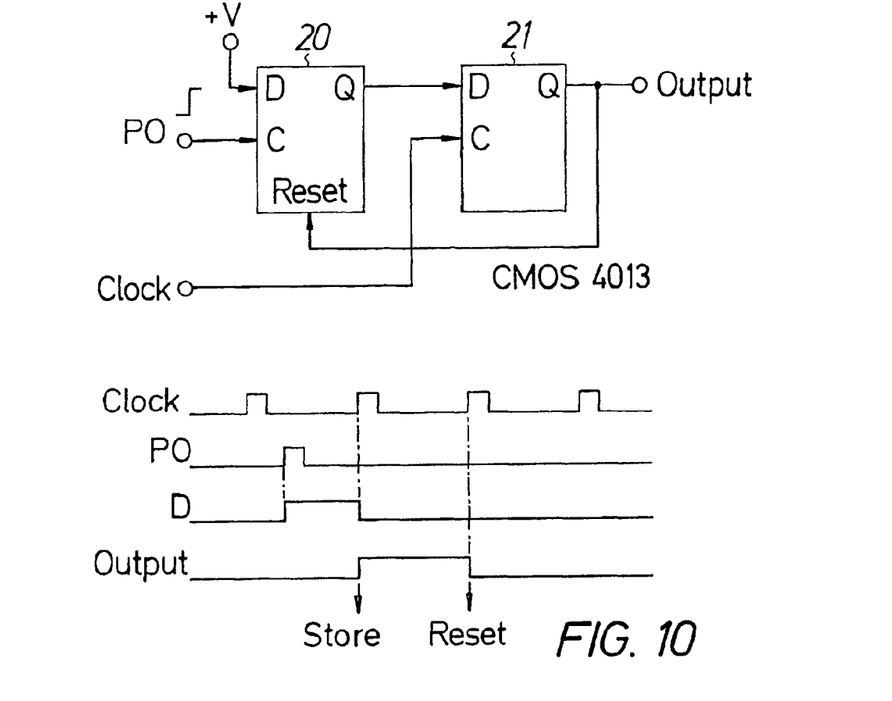
FIG. 10 is a circuit diagram of a synchronising circuit for synchronising the pulse P1 to clock pulses and a corresponding time diagram.

The synchronizer 15 synchronizes the pulse P1 to the clock pulses. FIG. 10 shows a suitable circuit for such a synchronizer. It is a "one-and-only-one" circuit, well known from digital systems. It gives exactly one clock-interval as an output in response to an outside world command. Two flip-flops from a standard CMOS circuit 4013 are connected in series. The outside world command is in this example shown as a positive edge P0. It may be an inverted signal P1 from FIG. 8. This sets the first flip-flop. The first flip-flop absorbs the time difference between the arrival of the outside-world signal and the clock edge. The second flip-flop generates a one-clock-wide output pulse and resets the first stage. Every time the circuit is triggered by an outside-world command it generates a one-and-only-one clock-interval pulse as an output.

The output pulse from the synchronizer goes to the buffer 17 and to the counter 16. The rising edge of the pulse gives an immediate "store" command to the buffer 17, which stores the counted value D from the counter. The falling edge of the pulse resets the counter to zero. The counter continues counting on the next clock pulse but now from zero. Consequently, the counter will count the time between every falling edge of the reset pulse without missing any clock pulses. Thus the time of a complete switch cycle is measured and it is represented by the stored counter value D.

FIG. 9 shows how the stored value D in the buffer 17 goes to a "decoder" 18 that generates 7 different digital data values, from ⅛ D to ⅞ D. Each such value goes to an individual "compare" unit 19, that compares the decoded value with the actual value from the counter. The compare units 19 give an output pulse when the two values are equal. The result is seven phase-shifted pulses P2–P8 as illustrated in FIG. 8. The compare unit 19 may include a "pulse shaper" that gives the pulses a suitable length, for example 5 microseconds.

The master circuit is supposed to operate continuously. Also the system in FIG. 9 operates continuously. This means that every switch cycle in the master circuit is measured. The calculation circuit reacts almost immediately and generates the stop pulses P2–P8 that will control the switch cycle in every slave circuit. Consequently, every switch cycle in the master circuit will immediately be followed by phase shifted switch cycles from the slave circuits. All the switch cycles will be related to the latest switch cycle in the master circuit. There is no extra time delay because of the calculation process.

Figure 11:
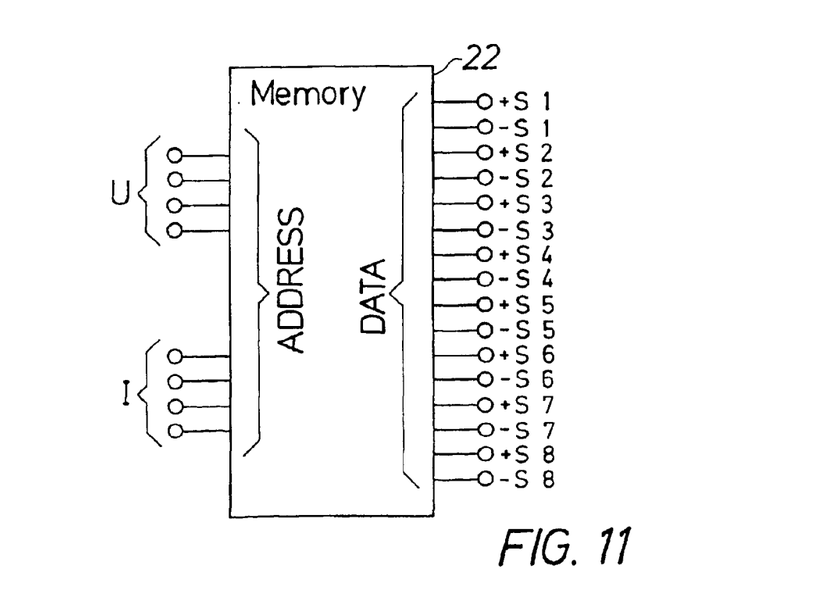
FIG. 11 is a block diagram a memory circuit addressed by voltage and current values to deliver control signals.

FIG. 6 shows how 8 individual switch circuits can be operated in different configurations, depending on the actual output voltage and output current. FIG. 11 shows an example of a method to select the different switch circuits as a function of voltage and current. A "memory" 22 has 8 input lines for memory address and 16 output lines for memory content. Every data word on the address lines gives the address to a memory cell that is programmed with pre-calculated values for the 16 output pins. The 16 output pins are used to control the selection of switch transistors in 8 different switch circuits.

Suppose for example that 4 address lines represent the actual output voltage in a binary scale, from full negative to full positive, and that the remaining 4 address lines represent the actual output current, also from full negative to full positive. This gives a matrix with 16×16=256 elements. Each such element defines the optimal combination of switch circuits for this operating point.

When the whole system is in operation, the voltages and currents will change and this changes the addresses to the memory cells, which control the selection of switch circuits. In order to avoid uncertainty and unnecessary transitions between the cells there should be a certain hysteresis effect in the generation of addresses to the memory 22.

Figure 12:
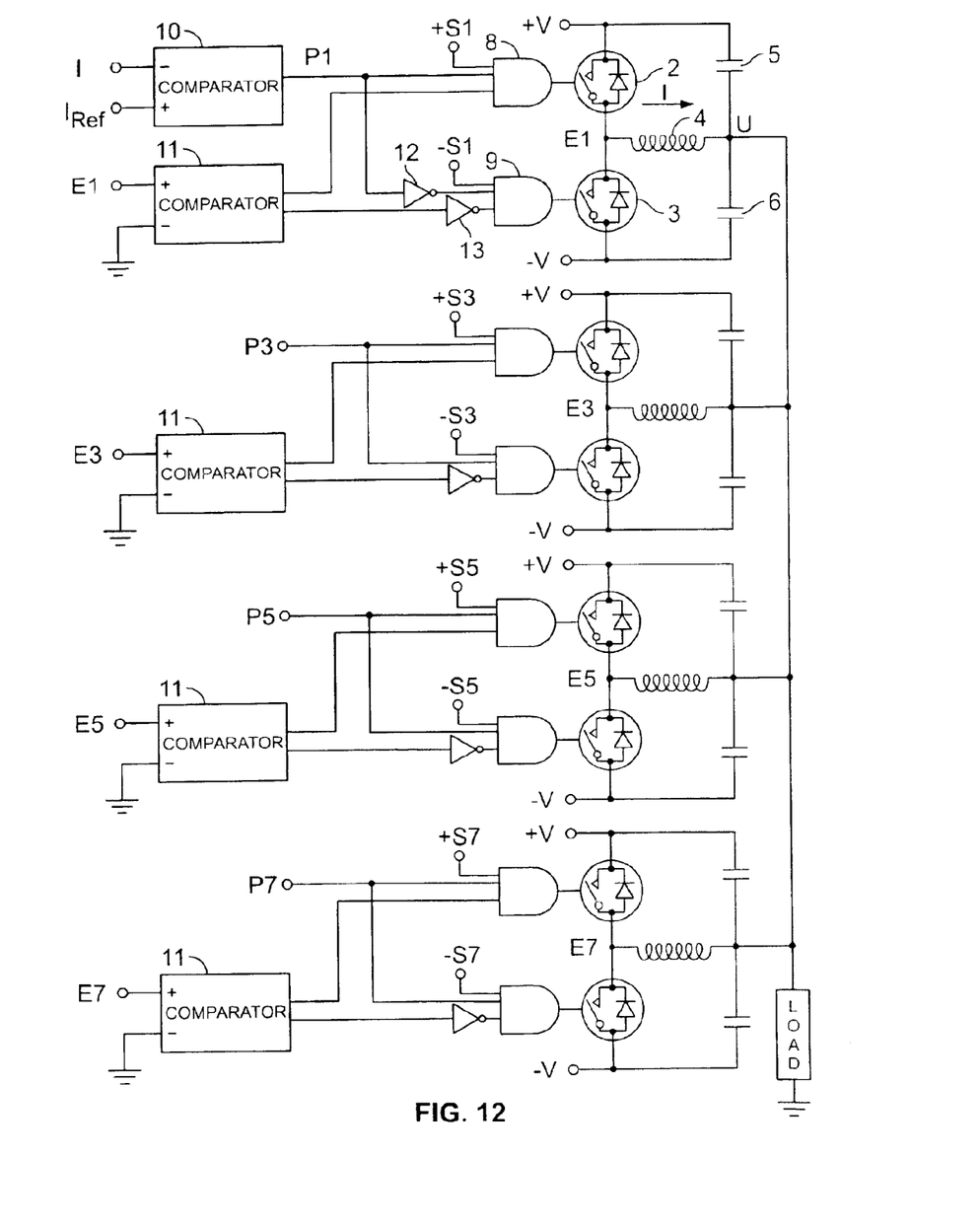
FIG. 12 is a circuit diagram of a multiple stage switch circuit with one master circuit and three slave circuits according to the present invention.

FIG. 12 shows an example with one master circuit and three slave circuits. The master circuit is controlled by the current reference value $I_{Ref}$ and the slave circuits are controlled by pulses P2–P8 from the circuits in FIG. 9 and control signals ±s1–s8 from FIG. 11. Only the master circuit should be activated when the reference current is zero or close to zero. The stop pulses P3, P5 and P7 will have the right shape both for the upper and the lower transistor and consequently no inverters 12 are necessary for these pulses.

The examples above have been based on a frequency range between 10 kHz and 20 kHz.

It is not necessary to have a frequency range of 2:1 but it has practical advantages. It is easy to double the output power in each step by connecting more units in parallel. However, the frequency range can be different, for example 3:1 or 4:1. It is also possible to build modules for different output powers, in order to reduce the number of modules connected in parallel. A range of such standard modules can be combined for different applications. If MOSFETs are used instead of IGBTs, the optimum frequency range may be still larger. Of course it is possible to combine switch circuits with MOSFETs and IGBTs in the same group of modules, for example MOSFETs for low current and IGBTs for high current.

FIG. 6 indicates another possibility for optimization. It may be necessary to have a group with 8 switch circuits in parallel in order to obtain a high output voltage, but it is perhaps not necessary to obtain 200% output current at low output voltage. In such a case it is possible to design a special unit which is equivalent with a group of 8 units but with a limited current capacity, for example 100%. The size and cost of the components will be lower. It would also be possible to design one slave unit with a small L but with a limited current capacity, for operation only when the output voltage is high.

According to FIG. 6 it is not possible to control currents below 12,5% of rated current. In reality, this problem is solved according to prior art. When the current is very low the switch circuit will automatically change the operating mode and switch between positive and negative values of inductor current. Then the mean value of this AC current will have a DC offset that represents the required current value.

If many identical switch circuits are used in parallel connection, it should not always be the same units that are used for a certain current level. It is possible to create a rotating order of operation, such that all circuits are used equally in order to share the load equally. However, it seems most practical to have one circuit operating at all times as a "master" circuit.

Control Considerations

The following discussion concentrates on motor control, because this is a major application for the switch circuit.

Electric circuits can be "voltage controlled" and "current controlled". If the control system is supplied from a voltage source (for example a capacitor) it is normally a voltage control system. If the control system is supplied from a current source (for example an inductor) it is normally a current control system. This can be described as "true" voltage control and "true" current control, respectively. It is, however, possible to convert a voltage control system to current control by means of a feedback loop. It is also possible to convert a current control system to voltage control.

Motor control systems can use all of the above mentioned control methods and it is important to understand the difference. Most modern frequency inverters for control of AC motors operate with voltage control. The frequency inverter has an output stage with one transistor bridge for every motor phase. The transistor bridge is supplied with a fixed DC voltage from a "DC link" (a capacitor). The output voltage to the motor is "pulse width modulated" in such a way that the mean value of the voltage pulses represents the intended motor control voltage.

Older frequency inverters, especially those based on thyristor technology, used current control. The DC link was an inductor, and the DC link current was directed to the different motor phases by thyristor switches.

Although a modern frequency inverter operates with voltage control it is common practice to convert it to current control by means of a current feedback loop. There is a very good reason to do this. Thanks to the current control it is possible to control the motor current accurately. This in turn makes it possible to control the motor torque accurately and to protect the motor and the inverter from overload by means of a well-defined current limit. This technology can be used with all types of motor control systems, and the control can take place in stator coordinates as well as in "field coordinates". ("Field oriented control" is a modern control system for AC motors.)

The switch circuit according to prior art is basically a current control system. The output inductor is "charged" with a well-defined current, which is then delivered to the load. The inductor current is controlled by an inner feedback loop. This loop is controlled by a reference signal $I_{Ref}$. The current control system is based on switch technology and consequently it can be described and controlled as a sampled system. However, if the sampling frequency is high in comparison with the bandwidth of the external control loop it can also be approximated as a continuous system. The control signal $I_{Ref}$ can be a continuous signal or a sampled signal.

It is possible to use the inner core of the switch circuit as a current source that controls the motor by means of the control signal $I_{Ref}$. Another possibility is to convert the switch circuit to a voltage control system by means of a voltage control feedback loop. The voltage control system would then be equivalent with the voltage control system in a modern frequency inverter with pulse width modulation. Such a voltage control feedback loop is described for the switch circuit according to prior art.

The master circuit controls the output current by means of the control signal $I_{Ref}$. The current gain of the master circuit is constant. However, when more switch circuits are connected in parallel with the master circuit, the current gain from the whole group of switch circuits will increase. It is necessary to adjust the gain constant accordingly. It is suitable to do this in the external control loops, which control the switch circuit.

A modern trend in power electronics is to control a motor by pre-calculated incremental flux changes. The magnetic flux can be described as the product of voltage and time (volt-seconds) and this is a reason to prefer voltage control instead of current control. A voltage control feedback loop can be designed as a continuous analog system or as a sampled digital system. Modern digital systems are fast enough for such purposes.

Stability Considerations

The purpose of the present invention is to extend the useful range of the switch circuit by means of parallel connected slave circuits that operate in synchronism with the master circuit. There is, however, an important difference between the master circuit and the slave circuits. The master circuit is designed as a closed loop control system that is stable during all operating conditions. Pulses from the master circuit control the slave circuits but there is no feedback in the slave systems. Consequently every slave circuit is an open loop control system. For this reason it is necessary to analyze the stability of the slave circuits. One such circuit will be studied and the results will be individually applicable on all slave circuits.

Figure 13:
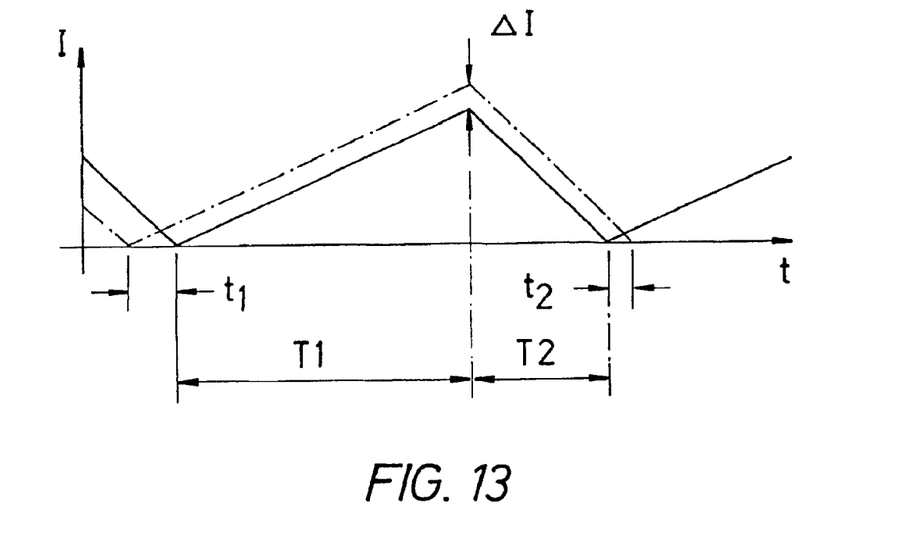
FIG. 13 is a diagram of a switch cycle in a slave circuit.

FIG. 13 illustrates a complete switch cycle in a slave circuit. The time intervals T1 and T2 are the same as in FIG. 2. They symbolize an ideal switch cycle, shown with unbroken lines. The real current in the slave circuit is shown with broken lines. The new time interval T1 starts too early in the slave circuit, with the time error $t_1$. The time error results in a too high peak current with the amplitude error $\Delta I$. Finally, the amplitude error results in a new time error $t_2$ in the beginning of next switch cycle. It is possible to calculate the relation between the time errors $t_1$ and $t_2$ by means of the following equations.

$$\Delta I = \frac{E-U}{L} t_1$$

$$-\Delta I = \frac{-E-U}{L} t_2$$

$$\frac{t_2}{t_1} = \frac{E-U}{E+U}$$

It should be observed that the time error "oscillates" around the ideal timing point. If one switch cycle starts too early ($t_1$) the next switch cycle will start too late ($t_2$) and vice versa.

This is no problem. The important thing is to know if the time error increases or decreases after the switch cycle. The above equation with the quotient between $t_2$ and $t_1$ gives the answer. The time error will decrease if the voltage U is positive and it will increase if U is negative. In this example the current I is positive and consequently a positive voltage U tells that the switch circuit operates in "motoring" mode, i.e. it delivers power to the load. A negative voltage U tells that the circuit receives power from the load, i.e. it operates in regenerative mode. In this case the error increases and consequently the circuit is unstable.

If the voltage U is zero the circuit will "oscillate" with a constant time error $t_1 = t_2$.

Figure 14:
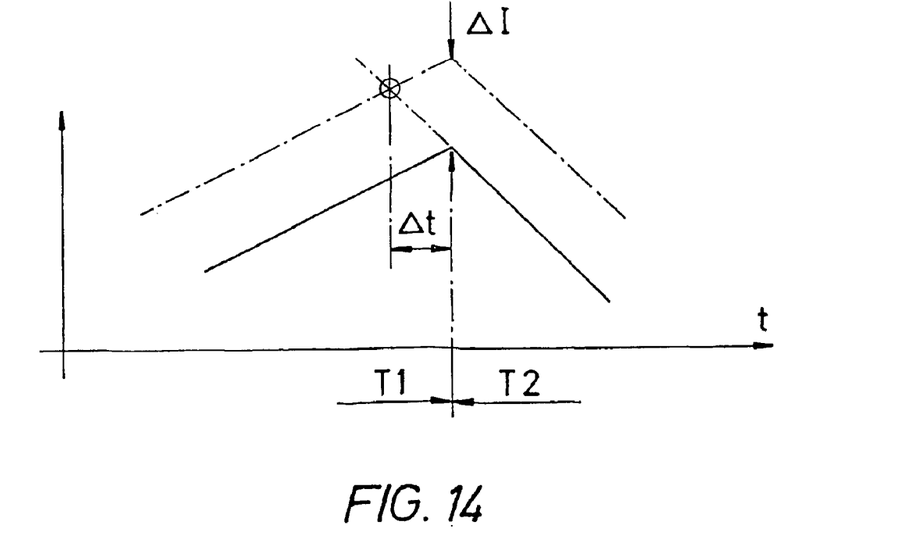
FIG. 14 is a segment of FIG. 13 in a larger scale.

Motor control systems must be able to operate in regenerative mode and consequently every slave circuit needs to be stabilized by a feedback signal. FIG. 14 shows an enlarged segment from FIG. 13. It illustrates that it would be possible to eliminate the original timing error $t_1$ if the stop pulse arrives earlier than the normal stop pulse. The optimal time adjustment would be $\Delta t$ as shown in the figure. The falling slope of the slave circuit will follow the same slope as the ideal switch cycle, and the next timing error will be zero.

Fortunately it is possible to calculate the optimal time adjustment $\Delta t$. First the time error $t_1$ is defined. Then the current error $\Delta I$ is expressed by means of two different equations and from these equations the time adjustment $\Delta t$ is obtained.

$$t_1 = T_{Master} - T_{Slave}$$

$$\Delta I = \frac{E-U}{L} t_1$$

$$\Delta I = \frac{E-U}{L} \Delta t + \frac{E+U}{L} \Delta t$$

$$\Delta t = t_1 \frac{E-U}{2E}$$

It can be concluded from FIG. 14 that the adjusted stop pulse must arrive earlier if the actual length of the last switch cycle was too short (as in FIG. 13). A similar analysis shows that the adjusted stop pulse must arrive later if the last switch cycle was too long.

It is easy to make the time adjustment as a correction to the pre-calculated delay times for the slave circuits according to FIG. 9. The time adjustment $\Delta t$ shall be subtracted from the original delay time. The calculation of $\Delta t$ can be made for example by a digital processor. All the necessary variables ($t_1$, E and U) are available or can be made available by means of measurement.

The adjustment can be described as a "dead-beat" control of the timing error. The whole error is taken care of in one single step. Of course all the slave circuits must have individual calculations and compensations.

The stabilization system shall operate continuously as long as the slave circuit is active. Normally the time error will be kept very small, but theoretically the system can take care of any error, also large errors. One large error may occur when a slave circuit changes state from inactive to active. The first pulse in the slave circuit starts when one switch transistor is turned on. This initiates the first time period T1 according to FIG. 13. The length of this period is undefined. There is a need to synchronize this first pulse.

Figure 15:
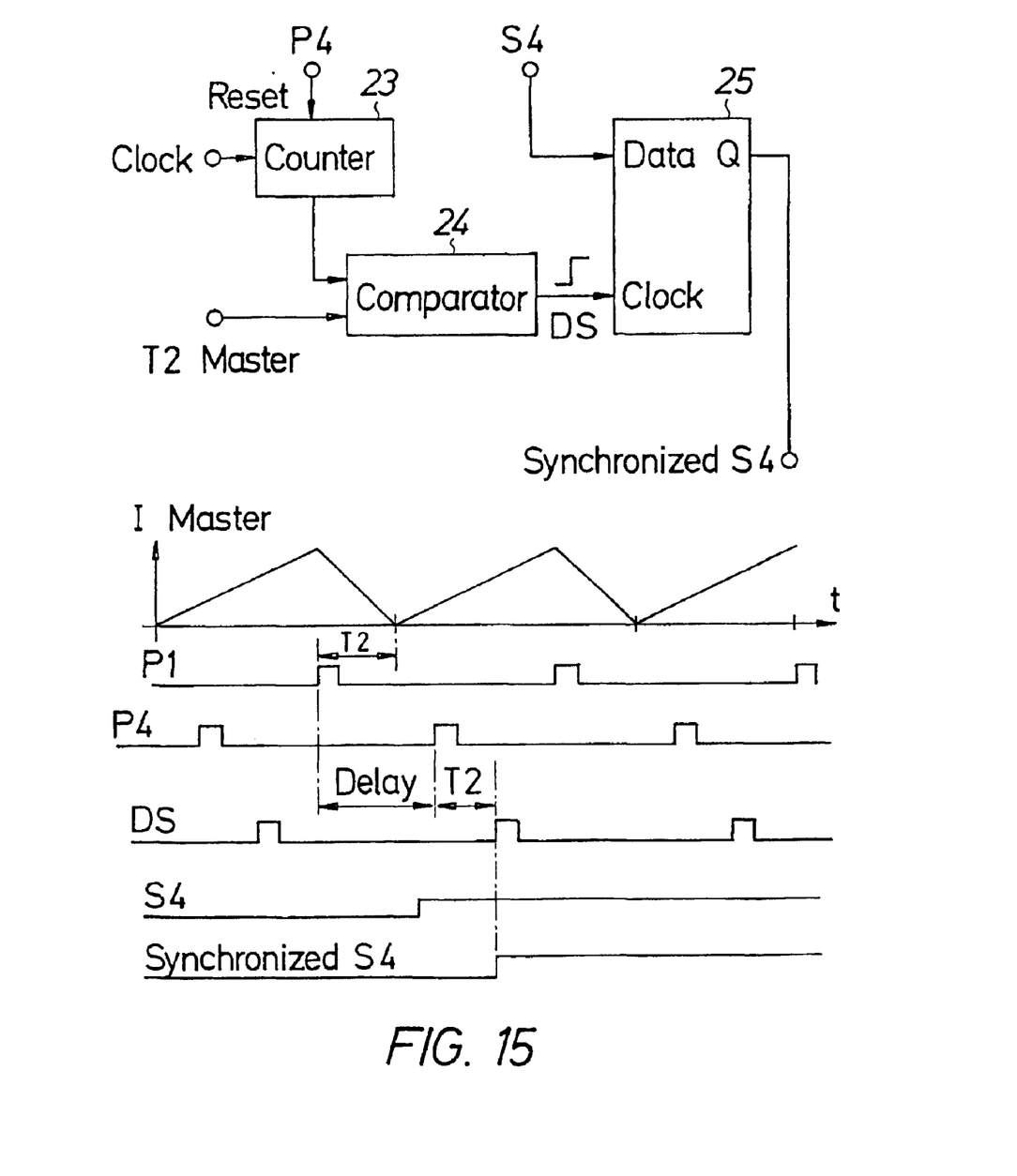
FIG. 15 is a circuit diagram of a synchronisation circuit for the start pulse and corresponding time diagrams.

FIG. 15 gives an example of a synchronization circuit for the start pulse. The circuit operates continuously and is triggered by one of the stop pulses P2–P8 in FIG. 9. FIG. 5 shows the stop pulse P4 for the corresponding slave circuit with the transistors +S4 and −S4. Every slave circuit needs its own synchronization circuit.

A counter 23 operates continuously and counts the clock pulses. It is reset to zero regularly by the stop pulses P4. A separate counter (not shown) has counted the length of the last time period T2 in the master circuit. Comparator 24 compares the output from counter 23 with the value of T2. It gives a positive output pulse DS (Delayed Stop) when the two input values are equal. The pulse DS goes to the clock input of a conventional D-type flip-flop 25 (for example CMOS 4013). The turn-on signal for transistor S4 is connected to the data input of flip-flop 25. The clock pulse sets the output Q of flip-flop 25 to the same value as the data input. The result is a synchronized turn-on signal S4, which will turn on the transistor in exactly the right moment. The synchronized signal S4 remains high as long as the data input S4 remains high. S4 can go low at any time but there is no need to synchronize the turn-off of the slave circuit. The time for turn-off is uncritical.

Conclusion

The switch circuit can be used with all kinds of loads, including all kinds of electric motors.

It can be concluded that the output characteristics of the switch circuit with regard to output voltage and current is well suited for motor drives. Very often a motor is required to have a high starting torque and a high acceleration at low speed. It is often an advantage to operate with constant output power in the whole speed range, because this is favorable for the power source, whether it is the electric power line or a battery. An electric car or an electric train are good examples of such drives. It should also be noted that an electric motor operates with constant output power in the field-weakening region.

Modern power electronics tends to become "digital". Every output pulse is calculated digitally and the response is immediately measured and corrected in the next pulse. The present invention makes use of this possibility and this gives a great flexibility and accuracy, which was impossible in older analog control systems.

The cost of signal circuits is very low in relation to the power circuits, especially if high power levels are controlled. It is not unrealistic to use a separate DSP (Digital Signal Processor) for every individual slave circuit. This gives an almost unlimited design freedom.

Some practical and economic considerations have influence on the design. In the case of identical modules the development cost is reduced. It can also be an advantage to build identical power modules that can be produced in larger numbers. This will result in lower production costs.

There a many requirements on a modern electronic power circuit, but above all it must be reliable. Normal practice says that a system with few components is more reliable than a system with many components. The present invention results in a system with many power circuits in parallel. This is a logical result of the specific switch process according to the invention. However, the specific switch process results in less switching stress. This improves the reliability and thus compensates for the larger number of components. Another advantage of parallel-connected smaller units is that the system designer has a much larger choice of suitable components for small and medium power than for very high power.

For very high power it is a clear advantage to have many parallel modules. It is not possible to build modules for extremely high power, because of lack of suitable components.

This description gives typical values for modern power components. It can be expected that newer and better power components in the future will be able to operate with higher frequencies and this will give much more design freedom, still within the scope of the invention.

What is claimed is:

1. A power supply circuit for providing power to a load, comprising:
   at least two supply stages each stage comprising a pair of switchable members in a bridge circuit and an LC filter connected between the centre of the bridge circuit and the load; and
   a control stage for controlling turning on and off of the switchable members, wherein at least two power supply stages are connected in parallel with a common output to the load, said at least two power supply stages being coupled to, controlled and synchronised by a common master control unit, which automatically produces a turn-on pulse for said at least two power supply stages that turns on said at least two power supply stages when the current through the inductor of the LC circuit is substantially zero, wherein the power supply circuit further comprises a unit for enabling a number of power supply stages while the rest of the power supply stages may be disabled in response to required output power characteristics.

2. A power supply circuit according to claim 1, wherein the number of enabled power supply stages is dependent of the output power, so that the switch frequency range of the power supply circuit is kept within predefined limits.

3. A power supply circuit according to claim 1, wherein power supply stages are assigned to a number of groups, wherein different groups include different number of power supply stages, said groups being arranged to operate at different output power ranges.

4. A power supply circuit according to claim 3, wherein all the power supply stages are identical as regards their power supply characteristics.

5. A power supply circuit according to claim 4, wherein the external signal to the master control unit is scaled in response to the number of enabled power supply stages.

6. A power supply circuit according to claim 4, wherein the assignment of the power supply stages are arranged to be shifted between the groups, such that the task of operating in the respective group, including operation as master power supply stage, is rotated between the power supply stages.

7. A power supply circuit according to claim 3, wherein the selection of the combination of power supply stages is made by means of a precalculated memory table.

8. A power supply circuit according to claim 7, wherein the memory table is arranged to receive input data representing desired current and voltage values, and to deliver control signals controlling the enabling of the number of power supply stages.

9. A power supply circuit according to claim 8, wherein each slave power supply stage comprises a synchronizing circuit for delaying the control signal by a delay time that is measured in the master circuit and represents the OFF-time of the transistor switch in the master circuit in connection with the first turn on of a new power supply stage.

10. A power supply circuit according to claim 3, wherein the number of power supply stages in succeeding groups are arranged as a geometric series, so that each further group is designed to operate at a higher output power range.

11. A power supply circuit according to claim 1, wherein the master control unit is arranged to operate with control logic for producing turn-off pulses to all power supply stages as a response to an external signal, and when the current of the inductor of the LC filter of one power supply stage has reached a predetermined value, said one power supply stage operating as a master power supply stage while the rest of the power supply stages operate as slave power supply stages.

12. A power supply circuit according to claim 11, wherein the turn-off pulses from the master control unit to the respective power supply stages are phase-shifted.

13. A power supply circuit according to claim 12, wherein the phase shifts are created based on the total pulse time in the master control unit, said total pulse time being divided by an integer corresponding to the number of enabled power supply stages into shorter pulse times.

14. A power supply circuit according to claim 13, further comprising a phase shift unit for delivering control pulses to the power supply stages, said phase shift unit comprising a clock input, a synchroniser for synchronizing an input pulse representing a switch cycle to a clock, a counter for counting clock pulses during a switch cycle, a buffer for storing the counter value at the end of a switch cycle, and a decoder for decoding the counter value to values suitable for each power supply stage.

15. A power supply circuit according to claim 14, wherein each slave power supply stage comprises a synchronisation unit for correcting a timing error in control pulses to the respective slave power supply stage, said synchronisation unit subtracting a correction term from the phase shift delay time.

16. A power supply circuit according to claim 15, wherein the correction term ($\Delta t$) is calculated in accordance with the formula $$\Delta t = t_1 \frac{E - U}{2E}$$

where $t_1$ is the time difference between the On-time in the master stage and the On-time in the respective slave stage, E is the bridge circuit voltage, and U is the output voltage.

17. A power supply circuit according to claim 11, wherein the control stage further comprises individual control units, one for each power supply stage, said individual control units producing their own turn-on pulses automatically to its power supply stage as a response to an internal signal when the current of the inductor of the LC filter of the respective power supply stage is substantially zero.

* * * * *